United States Patent [19]
Pittet et al.

[11] 3,940,499

[45] Feb. 24, 1976

[54] FOOD OR FLAVOR CONTAINING 2,6,6-TRIMETHYL-1-CYCLOHEXEN-1-YLACETALDEHYDE

[75] Inventors: Alan Owen Pittet, Atlantic Highlands; Erich Manfred Klaiber, Neptune; Manfred Hugo Vock, Locust, all of N.J.; Edward J. Shuster, Brooklyn, N.Y.; Joaquin Vinals, Red Bank, N.J.

[73] Assignee: International Flavors & Fragrances Inc., New York, N.Y.

[22] Filed: Sept. 19, 1974

[21] Appl. No.: 507,412

[52] U.S. Cl. ............... 426/534; 426/535; 426/536; 426/538; 252/522; 131/17 R; 260/598

[51] Int. Cl.² .................. A23L 1/226; A23L 1/235
[58] Field of Search ............... 260/598; 426/65, 538

[56] References Cited
UNITED STATES PATENTS 2,957,933  10/1960  Pommer et al. ................ 260/598 X

*Primary Examiner*—Joseph M. Golian
*Attorney, Agent, or Firm*—Arthur L. Liberman; Harold Haidt

[57] ABSTRACT

Processes and compositions are described for the use in foodstuff flavor and aroma and as foodstuff aroma imparting materials of 2,2,6-trimethyl-1-cyclohexen-1-ylacetaldehyde.

3 Claims, No Drawings

FOOD OR FLAVOR CONTAINING 2,6,6-TRIMETHYL-1-CYCLOHEXEN-1-YLACETALDEHYDE

BACKGROUND OF THE INVENTION

The present invention relates to 2,2,6-trimethyl-1-cyclohexen-1-ylacetaldehyde (or "beta-cyclohomocitral") produced by, interalia, a novel process described and claimed in copending Application for U.S. Pat. No. 507,414 filed on Sept. 19, 1974 and novel compositions using such beta-cyclohomocitral to alter the flavor and/or aroma of consumable materials.

There has been considerable work performed relating to substances which can be used to impart (or enhance) flavors and fragrances to (or in) various consumable materials. These substances are used to diminish the use of natural materials, some of which may be in short supply and to provide more uniform properties in the finished product. Fruity, woody and tea aromas as well as woody-tea and fruity-tobacco tastes are particularly desirable for many uses in foodstuff flavors. Woody, camphoraceous, green and earthy notes are desirable in several types of perfume compositions. Sweet, rich-tobacco, floral, fruity, green, woody, "damascenone-like" and earthy notes are desirable in tobacco flavoring compositions.

Arctander, "Perfume and Flavor Chemicals", 1969 discloses the use in perfume compositions and flavors of "cyclocitral", "dehydro-beta-cyclocitral", "isocyclocitral", "alpha-cyclocitrylidene acetaldehyde" and "beta cyclotrylidene acetaldehyde", thus:

i. "760: CYCLOCITRAL
  Alpha-cyclocitral = (2,2,6-trimethyl-5-cyclohexen-1-carboxaldehyde). beta-cyclocitral = (2,2,6-trimethyl-6-cyclohexen-1-carboxaldehyde).
  Both isomers are known and have been produced separately.

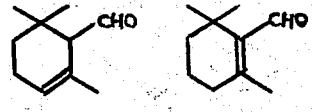

Very rarely offered commercially. These particular cyclocitrals have little or no interest to the creative perfumer, but they have served as part of many pieces of proof that isomers (alpha-beta) do often have different odors."

ii. "761: iso-CYCLOCITRAL
  A mixture of two chemicals:
    3,5,6-trimethyl-3-cyclohexen-1-carboxaldehyde (meta)cyclocitral).

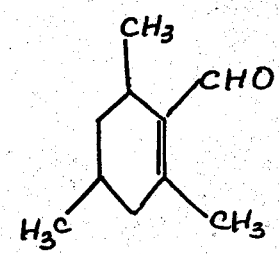

(corrected structure)

2,4,6-trimethyl-4-cyclohexen-1-carboxaldehyde (symmetric-iso-cyclocitral).

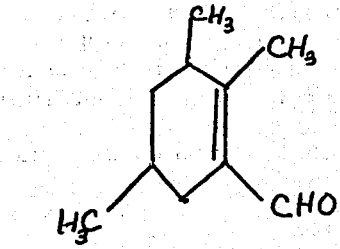

(corrected structure)

Powerful, and diffusive, foliage-green, "dark" weedy and dry odor, sometimes described as "Flower-shop odor". The earthy and wet-green notes are quite natural in high dilution and resemble the odor of stems from plants and flowers fresh from the soil.
  Finds use in perfume compositions where it blends excellently with Oakmoss products (compensates for sweetness and lifts the topnote), with Ionones (freshness), Geranium and Galbanum (enhances the green and "vegetable" notes), etc . . ."

iii. "762: alpha CYCLOCITRYLIDENE ACETALDEHYDE

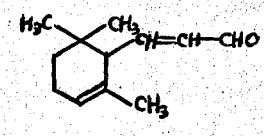

Mild, floral-woody, somewhat oily-herbaceous odor, remotely reminiscent of Rose with similarity to the odor of hydrogenated Ionones.
  Suggested for use in perfume compositions. It brings a certain amount of floral lift to Rose compositions, and performs fairly well even in soap. However, the cost of the rarely offered and never readily available lots are rather discouraging to the perfumer, and it is most conceivable that this material can be left out of the perfumer's library without any great loss . . ."

iv. "763: beta-CYCLOCITRYLIDENE ACETALDEHYDE
  2,6,6-trimethyl-1-cyclohexenyl-beta-acrolein.

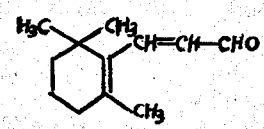

Sweet-woody, rather heavy odor, resembling that of beta-Ionone. More fruity than really floral, but not as tenacious as the Ionone.

Suggested for use in perfume compositions, but since it does not offer any new or unusual odor characteristics, and it cannot be produced in economical competition to beta-Ionone, there is little or no chance that it will ever become a standard shelf ingredient for the perfumer . . . "

v. "869: DEHYDRO-beta-CYCLOCITRAL (Safranal)
2,6,6-trimethyl-4,4-cyclohexadiene-1-carboxaldehyde

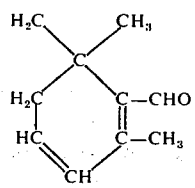

Very powerful, sweet, green-floral and somewhat tobacco-herbaceous odor of good tenacity. In extreme dilution reminiscent of the odor of Safran (Saffron).

Interesting material for fresh topnotes, as a modifier for aldehydic-citrusy notes, as a green-floral topnote in flower fragrances, etc. It blends excellently with the aliphatic Aldehydes, with Oakmoss products and herbaceous oils . . . "

Safranal and beta-cyclocitral are disclosed as volatile constituents of Greek Tobacco by Kimland et al., Phytochemistry 11 (309) 1972. Beta-cyclocitral is disclosed as a component of Burley Tobacco flavor by Demole and Berthet, Helv, Chim. Acta. 55 Fasc-6, 1866 (1972).

THE INVENTION

It has now been discovered that novel solid and liquid foodstuff and flavoring compositions having fruity, woody and tea aromas and woody-tea and fruity-tobacco tastes, novel perfume compositions having woody, camphoraceous, green, earthy notes; as well as novel tobacco flavoring compositions having sweet, rich-tobacco, floral, fruity, green, woody, "damascenone-like" ("Damascenone" is a compound having the structure:

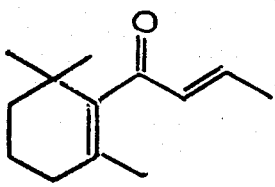

Its organoleptic properties are set forth in Swiss Patent No. 520,479 issued on May 12, 1972) and earthy notes may be provided by the utilization of beta-cyclohomocitral having the formula:

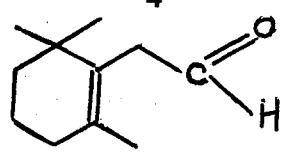

in foodstuffs, perfume compositions, perfumed articles, colognes and tobaccos as well as tobacco substitutes.

The beta-cyclohomocitral so useful, may be produced, preferably, by processes which comprises either (A) a reaction carried out in two steps, the first of which is an oxidation reaction of beta-ionone with either performic acid, peracetic acid or perpropionic acid to form beta-ionone enol ester and, secondly, hydrolyzing the beta-ionone enol ester in the presence of base (either aqueous or alcoholic) to form the desired beta-cyclohomocitral or (B) forming beta-cyclohomocitral by oxidizing beta-ionone with hydrogen peroxide in the presence of inorganic base.

More specifically, the process (A) comprises the steps of:

i. Reacting beta-ionone having the formula:

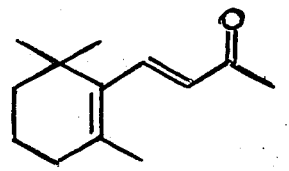

in the absence of dimethyl formamide with a peralkanoic acid having the formula:

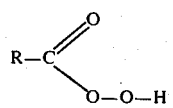

(wherein R is hydrogen, methyl or ethyl) to form beta-ionone enol ester having the formula:

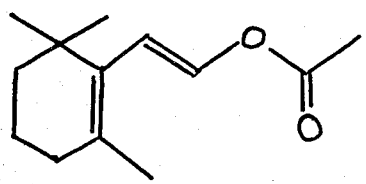

and not the expected beta-ionone epoxide having one of the formulae:

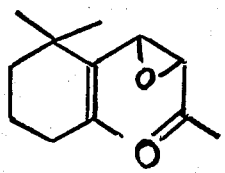

and/or .

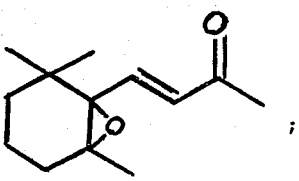

and ii. hydrolyzing the beta-ionone enol ester in the presence of base (aqueous or alcoholic) to form beta-cyclohomocitral.

Insofar as the oxidation reaction is concerned:

A. where peralkanoic acids are used as the oxidizing agents, the reaction is preferably carried out in the presence of a buffer such as an alkali metal salt of a lower alkanoic acid or an alkali metal carbonate with a lower alkanoic acid such as propionic acid acetic acid or formic acid with the following provisos:

i. The reaction is preferably carried out at temperatures of from 15°C up to about 75°C. Lower temperatures result in slower and less complete reaction and higher temperatures than 75°C result in lower yields of the desired product and significantly higher percentages of by-products. The most preferred temperature of reaction is 25°C.

ii. A slight molar excess (from 10 up to 15 percent) of peracetic acid gives a slightly higher yield of product. A large excess (about 200 percent), however, results in the formation of dihydroactinodiolide having the structure:

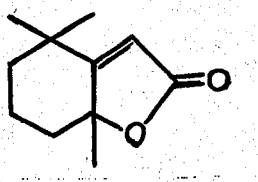

in about 30–35 percent yield when no buffer (e.g., potassium acetate) is present in the reaction mass;

iii. Where potassium carbonate is substituted for potassium acetate as a buffer, the yield of product obtained is substantially the same;

iv. On the other hand, a slightly lower yield of product is obtained by substituting sodium acetate for potassium acetate as the buffer;

v. Substitution of formic acid for acetic acid in the reaction mass gives rise to a lower yield of product.

vi. Any solvent inert to the action of peralkanoic acids may be used in this first oxidation reaction using alkanoic acids. For instance, the use of cyclohexane or chloroform as a solvent does not have an appreciable effect on the yield of product;

vii. Omission of the buffer (i.e., thus performing the reaction under strongly acidic conditions) results in an incomplete reaction, lower yield and greater quantity of by-product(s);

viii. The use of dimethyl formamide as solvent results in the exclusive formation of beta-ionone epoxide having the structure:

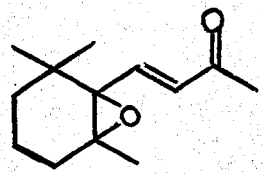

in about 70–75% yield and, accordingly, the presence of dimethyl formamide must be avoided;

ix. The use of monoperphthalic acid (formed in situ from phthalic anhydride and hydrogen peroxide) yields beta-ionone epoxide in 60–70 percent yield. The use of perbenzoic acid in place of peralkanoic acid has also been used to make beta-ionone epoxide R. Yves, et al., Hevl. Chim. Acta, 29, 880 (1946).

It may be concluded that a peralkanoic acid such as peracetic acid in slight excess in the presence of a buffer system, preferably composed of acetic acid/potassium acetate is the preferred way to oxidize beta-ionone at 25°C to the corresponding enol acetate.

The beta-ionone enol ester preferably is hydrolyzed by 10 percent alkali metal hydroxide (e.g., potassium hydroxide, lithium hydroxide or sodium hydroxide) in admixture with 50 percent aqueous methanol, although other mild hydrolysis conditions (such as aqueous potassium carbonate, sodium carbonate or lithium carbonate solution) may also be used. As a result of the hydrolysis, beta-cyclohomocitral is formed.

The resultant reaction product, beta-cyclohomocitral may then be refined according to standard techniques, e.g., preparative gas chromatography, extraction, distillation and the like as further exemplified herein.

B. Where hydrogen peroxide (in the presence of inorganic base) is used as the oxidizing agent, the beta-cyclohomocitral is formed in one step from beta-ionone. The strength of hydrogen peroxide used is from about 10 percent up to about 50 percent. The inorganic base used may be an alkali metal hydroxide or alkali metal carbonate such as sodium carbonate, potassium carbonate, lithium carbonate, sodium hydroxide, potassium hydroxide or lithium hydroxide; preferably sodium hydroxide. The mole ratio of hydrogen peroxide: beta-ionone is preferably from about 1.1:1 up to about 3:1.

The aforementioned processes are specific to beta-ionone. As further exemplified infra, when the reaction conditions of this process are applied to alpha-ionone, as opposed to beta-ionone, epoxide formation occurs and neither a substantial amount of enol acetate nor isomers of beta-cyclohomocitral are formed.

The 2,2,6-trimethyl-1-cyclohexen-1-ylacetaldehyde (or beta-cyclohomocitral) of our invention is capable of supplying and/or potentiating certain flavor and aroma notes usually lacking in many fruit flavors as well as tobacco flavors heretofore provided. Furthermore, the beta-cyclohomocitral of our invention is capable of supplying certain fragrance notes usually lacking in many perfumery materials, for example, petitgrain fragrances.

When the beta-cyclohomocitral of our invention is used as a food flavor adjuvant, the nature of the co-ingredients included with the said beta-cyclohomocitral in formulating the product composition will also serve to alter the organoleptic characteristics of the ultimate foodstuff treated therewith.

As used herein in regard to flavors, the term "alter" in its various forms means "supplying or imparting flavor character or note to otherwise bland, relatively tasteless substances or augmenting the existing flavor characteristic where a natural flavor is deficient in some regard or supplementing the existing flavor impression to modify its quality, character or taste". As used herein, the term "foodstuff" includes both solids and liquids ingestible materials which usually do, but need not, have nutritional value. Thus, foodstuffs include soups, convenience foods, beverages, dairy products, candies, vegetables, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxyanisole (mixture of 2- and 3- tertiary-butyl-4-hydroxyanisole), butylated hydroxy toluene (2,6-di-tertiarybutyl-4-methyl phenol), propyl gallate and the like and sequestrants, e.g., citric acid.

Thickener compounds include carriers, binders, protective colloids, suspending agents, emulsifiers and the like, e.g., agaragar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono-and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents e.g., sodium acetate, ammonium bicarbonate, ammonium phosphate, citric acid, lactic acid, vinegar and the like; colorants, e.g., carminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-3-pentenoic acid; ketones and aldehydes, e.g., acetaldehyde, acetophenone, acetone, acetyl methyl carbinol, acrolein, n-butanal, crotonal, diacetyl, beta, beta-dimethylacrolein, n-hexanal, 2-hexenal, cis-3-hexenal, 2-heptanal, 4-(p-hydroxyphenyl)-2-butanone, alpha-ionone, beta-ionone, methyl-3-butanone, 2-pentanone, 2-pentenal and propanal; alcohols such as 1-butanal, benzyl alcohol, 1-borneol, trans-2-buten-1-ol, ethanol, geraniol, 1-hexanal, 2-heptanol, trans-2-hexenol-1, cis-3-hexen-1-ol, 3-methyl-3-buten-1-ol, 1-pentenol, 1-penten-3-ol, p-hydroxyphenyl-2-ethanol, isoamyl alcohol, isofenchyl alcohol, phenyl-2-ethanol, alpha-terpineol, cisterpineol hydrate; esters, such as butyl acetate, ethyl acetate, ethyl acetoacetate, ethyl benzoate, ethyl butyrate, ethyl caproate, ethyl cinnamate, ethyl crotonate, ethyl formate, ethyl isobutyrate, ethyl isovalerate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylbutyrate, propyl acetate, amyl acetate, amyl butyrate, benzyl salicylate, dimethyl anthranilate, ethyl methylphenylgycidate, ethyl succinate, isobutyl cinnamate and terpenyl acetate; essential oils, such as jasmine absolute, rose absolute, orris absolute, lemon essential oil, Bulgarian rose, yara yara, natural raspberry oil and vanilla; lactones; sulfides, e.g., methyl sulfide and other materials such as maltol, acetoin and acetals (e.g., 1,1-diethoxyethane, 1,1-dimethoxyethane and dimethoxymethane.

The specific flavoring adjuvant selected for use may be either solid or liquid depending upon the desired physical form of the ultimate product, i.e., foodstuff, whether simulated or natural, and should, in any event, be capable of providing an environment in which the beta-cyclohomocitral can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of beta-cyclohomocitral employed in a particular instance can vary over a relatively wide range whereby to its desired organoleptic effects having reference to the nature of the product are achieved. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected to be effective, i.e., sufficient to alter the organoleptic characteristics of the parent composition, whether foodstuff per se or flavoring composition.

The use of insufficient quantities of beta-cyclohomocitral will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of beta-cyclohomocitral ranging from a small but effective amount, e.g., 0.5 parts per million up to about 20 parts per million by weight based on total composition are suitable. Concentrations in excess of the maximum quantity stated are not normally recommended, since they fail to prove commensurate enhancement of organoleptic properties. In those instances, wherein the beta-cyclohomocitral is added to the foodstuff as an integral component of a flavoring composition, it is, of course, essential that the total quantity of flavoring composition employed be sufficient to yield an effective beta-cyclohomocitral concentration in the foodstuff product.

Food flavoring compositions prepared in accordance with the present invention preferably contain the beta-cyclohomocitral in concentrations ranging from about 0.1% up to about 15% by weight based on the total weight of the said flavoring composition.

The compositions described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the beta-cyclohomocitral with, for example, gum arabic, gum tragacanth, carrageenan and the like, and thereafter spray-drying the resultant mixture whereby to obtain the particular solid product. Pre-prepared flavor mixes in powder form, e.g., a fruit-flavored powder mix are obtained by mixing the dried solid components, e.g., starch, sugar and the like and beta-cyclohomocitral in a dry blender until the requisite degree of uniformity is achieved.

It is presently preferred to combine with the beta-cyclohomocitral, the following adjuvants:
p-Hydroxybenzyl acetone;
Geraniol;
Acetaldehyde;
Maltol;
Ethyl methyl phenyl glycidate;
Benzyl acetate;
Dimethyl sulfide;
Vanillin;
Methyl cinnamate;
Ethyl pelargonate;
Methyl anthranilate;
Isoamyl acetate;
Isobutyl acetate;
Alpha ionone;
Ethyl butyrate;
Acetic acid;
Gamma-undecalactone;
Naphthyl ethyl ether;
Diacetyl;
Ethyl acetate;
Anethole;
Isoamyl butyrate;
Cis-3-hexenol-1;
2-Methyl-2-pentenoic acid;
Elemecine (4-allyl-1,2,6-trimethoxy benzene);
Isoelemecine (4-propenyl-1,2,6-trimethoxy benzene); and
2-(4-hydroxy-4-methylpentyl) norbornadiene prepared according to U.S. Application for letters Patent 461,703 filed on Apr. 17, 1974

An additional aspect of our invention provides an organoleptically improved smoking tobacco product and additives therefor, as well as methods of making the same which overcome specific problems heretofore encountered in which specific desired woody "damascenone-like" flavor characteristics of natural tobacco are created or enhanced and may be readily controlled and maintained at the desired uniform level regardless of variations in the tobacco components of the blend.

This invention further provides improved tobacco additives and methods whereby various desirable damascenone-like, woody flavoring characteristics with sweet, floral, fruity, earthy and green notes may be imparted to smoking tobacco products and may be readily varied and controlled to produce the desired uniform flavoring characteristics.

In carrying out this aspect of our invention, we add to smoking tobacco materials or a suitable substitute therefor (e.g., dried lettuce leaves) an aroma and flavor additive containing as an active ingredient beta-cyclohomocitral.

In addition to the beta-cyclohomocitral of our invention other flavoring and aroma additives may be added to the smoking tobacco material or substitute therefor either separately or in mixture with the beta-cyclohomocitral as follows:

I. Synthetic Materials:
Beta-ethyl-cinnamaldehyde;
Eugenol;
Dipentene;
Damascenone;
Maltol;
Ethyl maltol;
Delta undecalactone;
Delta decalactone;
Benzaldehyde;
Amyl acetate;
Ethyl butyrate;
Ethyl valerate;
Ethyl acetate;
2-Hexenol-1,2-methyl-5-isopropyl-1,3-nonadiene-8-one;
2,6-Dimethyl-2,6-undecadiene-10-one;
2-Methyl-5-isopropyl acetophenone;
2-Hydroxy-2,5,5,8a-tetramethyl-1-(2-hydroxyethyl)-decahydronaphthalene;
Dodecahydro-3a-6,6,9a-tetramethyl naphtho-(2,1-b)-furan
4-Hydroxy hexanoic acid, gamma lactone;
Polyisoprenoid hydrocarbons defined in Example V of U.S. Pat. No. 3,589,372 issued on June 29, 1971.

II. Natural Oils
Celery seed oil;
Coffee extract;
Bergamot Oil;
Cocoa extract;
Nutmeg oil;
Origanum oil An aroma and flavoring concentrate containing beta-cyclohomocitral and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of natural and/or sweet notes, we have found that satisfactory results are obtained if the proportion by weight of the sum total of beta-cyclohomocitral to smoking tobacco material is between 250 ppm and 1,500 ppm (0.025–0.15 %) of the active ingredients to the smoking tobacco material. We have further found that satisfactory results are obtained if the proportion by weight of the sum total of betacyclohomocitral used to flavoring material is between 2,500 and 10,000 ppm (0.25–1.5%).

Any convenient method for incorporating the beta-cyclohomocitral in the tobacco product may be employed. Thus, the beta-cyclohomocitral taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of the beta-cyclohomocitral taken alone or taken further together with other flavoring additives as set forth above, may be applied by means of a suitable applicator such as a brush or roller on the paper or leaf wrapper for the smoking product, or it may be applied to the filter by either spraying, or dipping, or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the beta-cyclohomocitral in excess of the amounts or concentrations above indicated so that when blended with other tobaccos, the final product will have the percentage within the indicated range.

In accordance with one specific example of our invention, an aged, cured and shredded domestic burley tobacco is spread with a 20% ethyl alcohol solution of beta-cyclohomocitral in an amount to provide a tobacco composition containing 800 ppm by weight of beta-cyclohomocitral on a dry basis. Thereafter, the alcohol is removed by evaporation and the tobacco is manufactured into cigarettes by the usual techniques. The cigarette when treated as indicated has a desired and pleasing aroma which is detectable in the main and side streams when the cigarette is smoked. This aroma is described as being sweeter, rich, less harsh, more tobacco-like and having woody, damascenone-like notes.

While our invention is particularly useful in the manufacture of smoking tobacco, such as cigarette tobacco, cigar tobacco and pipe tobacco, other tobacco products formed from sheeted tobacco dust or fines may also be used. Likewise, the beta-cyclohomocitral of our invention can be incorporated with materials such as filter tip materials, seam paste, packaging materials and the like which are used along with tobacco to form a product adapted for smoking. Furthermore, the beta-cyclohomocitral can be added to certain tobacco substitutes of natural or synthetic origin (e.g., dried lettuce leaves) and, accordingly, by the term "tobacco" as used throughout this specification is meant any composition intended for human consumption by smoking or otherwise, whether composed of tobacco plant parts or substitute materials or both.

The beta-cyclohomocitral and one or more auxiliary perfume ingredients, including, for example, alcohols, aldehydes, nitriles, esters, cyclic esters, and natural essential oils, may be admixed so that the combined odors of the individual components produce a pleasant and desired fragrance, particularly and preferably in petitgrain fragrances. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual components which contribute its particular olfactory characteristics, but the over-all effect of the perfume composition will be the sum of the effects of each of the ingredients. Thus, the beta-cyclohomocitral can be used to alter the aroma characteristics of a perfume composition, for example, by utilizing or moderating the olfactory reaction contributed by another ingredient in the composition.

The amount of beta-cyclohomocitral of our invention which will be effective in perfume compositions depends on many factors, including the other ingredients, their amounts and the effects which are desired. It has been found that perfume compositions containing as little as 0.1% of beta-cyclohomocitral (e.g., 0.05%) can be used to impart earthy, green odor to soaps, cosmetics or other products. The amount employed can range up to 10% of the fragrance components and will depend on considerations of cost, nature of the end product, the effect desired on the finished product and the particular fragrance sought.

The beta-cyclohomocitral is useful, taken alone or in perfume compositions as an olfactory component in detergents and soaps, space odorants and deodorants, perfumes, colognes, toilet water, bath preparations, such as bath oils, and bath solids; hair preparations, such as lacquers, brilliantines, pomades and shampoos; cosmetic preparations, such as creams, deodorants, hand lotions and sun screens; powders, such as talcs, dusting powders, face powders and the like. When used as an olfactory component as little as 1% of beta-cyclohomocitral will suffice to impart a green, earthy note to petitgrain formulations. Generally, no more than 3% of beta-cyclohomocitral based on the ultimate end product is required in the perfume composition.

In addition, the perfume composition or fragrance composition of our invention can contain a vehicle, or carrier for the beta-cyclohomocitral. The vehicle can be a liquid such as an alcohol, a non-toxic alcohol, a non-toxic glycol, or the like. The carrier can also be an absorbent solid, such as a gum (e.g., gum arabic) or components for encapsulating the composition (such as gelatin).

It will thus be apparent that beta-cyclohomocitral can be utilized to alter the sensory properties, particularly organoleptic properties, such as flavor and/or fragrance of a wide variety of consumable materials.

Examples I—VIII, X, XV, XVII, XXV and XXVI, following, serve to illustrate processes for producing beta-cyclohomocitral useful in our invention. Example IX, following, serves to illustrate the unworkability of this process where dimethyl formamide is used in the oxidation reaction of beta-ionone with peracetic acid.

Example III, serves to illustrate the unworkability of the reaction where no buffer, e.g., sodium acetate, is used. Examples XI–XIV and XVIII–XXIV illustrate the utility of beta-cyclohomocitral. Example XVI illustrates the unworkability of the above process in forming alpha-ionone enol ester when operated on alpha-ionone rather than beta-ionone. It will be understood that these Examples are illustrative and the invention is to be considered restricted thereto only as indicated in the appended claims. All parts and percentages given herein are by weight unless otherwise specified.

EXAMPLE I

A. Production of Beta-ionone Enol Ester From Beta-ionone

Into a two liter reaction flask equipped with stirrer, thermometer, reflux condenser, addition funnel and cooling bath, the following materials are added:
 i. Solution of 96 grams beta-ionone in 300 cc chloroform;
 ii. 30 grams sodium acetate 95 Grams of 40 percent peracetic acid is then added, with cooling, slowly at 10°C during a period of 1 hour. The reaction mass is stirred at 10°C for an additional hour and the solution is then allowed to slowly warm up to room temperature. The reaction mass is then poured into 1 liter of water and the resultant organic and aqueous phases are separated. The aqueous phase is then extracted with 100 cc of chloroform and the resultant organic phases are then bulked. The solvent is evaporated from the organic phase to yield 99.5 grams of an oil which is then chromatographed on 1,000 grams of alumina deactivated with 5% w/w water and eluted as follows:

| Fraction | Volume of Solvent | Quantity of Solute Eluted |
|---|---|---|
| 1 | 750 cc hexane | 8.0 grams |
| 2 | 500 cc hexane | 31.7 grams |
| 3 | 300 cc hexane | 13.5 grams |
| 4 | 250 cc hexane | 7.0 grams |
| 5 | 250 cc hexane | 1.9 grams |
| 6 | 250 cc hexane | 1.6 grams |
| 7 | 600 cc 25% diethyl ether-75% hexane | 15.6 grams |
| 8 | 600 cc diethyl ether | 15.3 grams |

Fractions 1–4 are composed mainly of beta-ionone enol ester.

The spectral data for a purified sample of this material obtained by preparative gas chromatography confirm the structure:

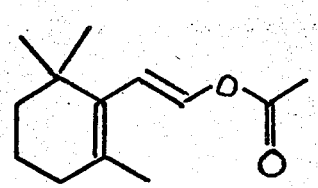

The mass spectrum of this compound has the following fragmentation pattern, in decreasing order of ion abundance:

m/e 166 (100), 151 (81), 43 (30), 208 (30) (molecular ion) and 95 (18). The infrared spectrum shows the following characteristic absorption bands (cm$^{-1}$):

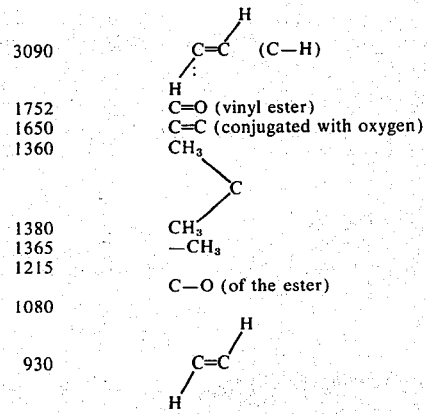

The NMR spectrum exhibits in CDCl$_3$ solution the following proton absorptions (chemical shifts in ppm):

| Ppm | Multiplicity | Assignment | No. of Protons |
|---|---|---|---|
| 1.00 | (s) | CH$_3$ CH$_3$ \\/ C | 6H |
| 1.70–1.40 | (m) | —CH$_2$— | 7H |
| 1.76 | (s) | =C—CH$_3$ | |
| 2.00 | (t) | =C—CH$_2$— | 2H |
| 2.16 | (s) | CH$_3$—C(=O)O— | 3H |
| 5.86 and 7.20 | (m) | Olefinic protons | 2H |

B. HYDROLYSIS TO FORM BETA-CYCLOHOMOCITRAL FROM BETAIONONE ENOL ESTER

Beta-ionone enol ester (60.2 grams from Fractions 1–4 produced in Part A) is added to 280 cc of 10 percent potassium hydroxide solution, (50:50 water:methanol mixture) at room temperature and stirred for a period of 30 minutes. Water 1,000 cc is added to the reaction mass which is then extracted with three 250 cc portions of diethyl ether. The combined ether extract is washed twice with two 100 cc portions of saturated sodium chloride solution, dried over anhydrous magnesium sulfate and evaporated to obtain 53 grams of an oil, beta-cyclohomocitral.

The crude beta-cyclohomocitral is distilled at 2 mm Hg pressure and the fraction boiling at 70°–80°C is collected (35.6 g).

Gas chromatographic analysis indicates that the product is about 85% pure. A pure sample of betacyclohomocitral is obtained by preparative chromatography (conditions: 10 feet × ¼inch 10% carbowax 20M-packed stainless steel column at 220°C isothermal) and is characterised by the following analytical data as:

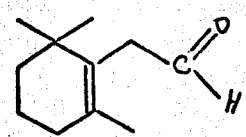

Mass spectral fragmentation, in decreasing order of ion abundance:

m/e (%) 107(100); 29(93); 151(90); 41(88); 81(80); 95(67); 123(57); 55(45); 39(45); 27(43); 166(Mol ion)(35).

The infrared spectrum shows the following characteristic absorption bands (cm$^{-1}$):

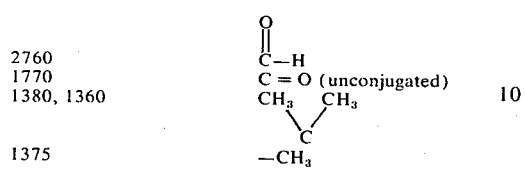

| 2760 | C—H |
| 1770 | C=O (unconjugated) |
| 1380, 1360 | CH$_3$ \ / CH$_3$ |
| | C |
| 1375 | —CH$_3$ |

The NMR spectrum of the compound is in agreement with the above structure:

| (PPM) | Multiplicity | Assignment | Number of Protons |
|---|---|---|---|
| 0.98 | (s) | CH$_3$ \ C / CH$_3$ | 6H |
| 1.58 | (s) | =C—CH$_3$ | |
| 1.80–1.42 | (m) | —CH$_2$— | 9H |
| 2.00 | (t) | =C—CH$_2$—C(=O) | 2H |
| 9.58 | (t) | HC=O | 1H |

EXAMPLES II–X

The following examples, carried out using the same procedure as Example I, illustrate the results which occur when parameters of the oxidation reaction of beta-ionone with peracetic acid are varied, e.g., as to buffer, solvent, temperature presence of organic base and ratio of organic alkanoic acid to peracetic acid. The percentages given are obtained by gas chromatographic analyses of the reaction mixture after 30 minutes and do not represent yields of isolated material.

| Example No. | % Enol Ester | % Starting Material | % By-Products | Reactants and Reaction Conditions |
|---|---|---|---|---|
| II | 47 | 24 | 29 | Acetic acid-(150 cc) Sodium acetate (20 g) Beta-ionone-(30 g) 40% peracetic acid-(30 g) Temperature: 25°C. |
| III | 12 | 52 | 36 | Acetic acid-(150 g) Beta-ionone-(30 g) 40% peracetic acid-(30 g) Temperature: 25°C. |
| IV | 40 | 29 | 31 | Cyclohexane-(150 cc) Sodium acetate-(20 g) Beta-ionone-(30 g) 40% peracetic acid (30 g) Temperature: 25°C |
| V | 52 | 26 | 22 | Acetic acid-(150 cc) Potassium acetate (35 g) Beta ionone-(30 g) 40% peracetic acid (30 g) Temperature: 25°C |
| VI | 31 | 30 | 39 | Formic acid-(150 cc) Potassium acetate-(50 g) Beta-ionone-(30 g) 40% peracetic acid (30 g) Temperature: 25°C |
| VII | 49 | 6 | 45 | Acetic acid-(150 cc) Potassium acetate-(35 g) Beta-ionone-(30 g) 40% Peracetic acid (33 g) Temperature: 25°C |
| VIII | 36 | 21 | 43 | Acetic acid-(150 cc) Potassium acetate-(35 g) Beta-ionone-(30 g) 40% Peracetic acid-(33 g) Temperature: 50°C |
| IX | 0 | 9 | 91 Beta-ionone epoxide | Dimethyl formamide (150 cc) Beta-ionone-(30 g) 40% peracetic acid-(33 g) Temperature: 4 days at a temperature of 18°C. |
| X | 55 | 17 | 28 | Acetic acid-(450 cc) Potassium acetate-(105 g) Beta-ionone-(96 g) 40% peracetic acid-(105 g) Temperature: 25°C. |

EXAMPLE XI

Petitgrain Formulation

The following mixture is prepared:

| Ingredients | Parts by Weight |
|---|---|
| Betacyclohomocitral | 20 |
| Linalool | 500 |
| Linalyl Acetate | 600 |
| Dimethyl Anthranilate | 2 |
| Terpineol | 20 |
| Geraniol | 30 |
| Terpinyl Acetate | 10 |
| Geranyl Acetate | 5 |
| Ocimene | 20 |
| Limonene | 50 |
| Pinene | 20 |
| Nerolidol | 10 |

The beta-cyclohomocitral imparts the green, earthy note of petitgrain required in such petitgrain formulations.

EXAMPLE XII

Preparation of a Soap Composition

100 Grams of soap chips are mixed with 1 gram of the perfume composition of Example XI until a substantially homogeneous composition is obtained. The perfumed soap composition manifests an excellent petitgrain character with excellent green, earthy notes.

EXAMPLE XIII

Preparation of a Detergent Composition

A total of 100 grams of detergent powder is mixed with 0.15 grams of the perfume composition of Example XI, until a substantially homogeneous composition is obtained. This composition has an excellent petitgrain aroma with earthy green notes.

EXAMPLE XIV

Raspberry Flavor Formulation

The following basic raspberry flavor formulation is produced:

| Ingredient | Parts by Weight |
|---|---|
| Vanillin | 2.0 |
| Maltol | 5.0 |
| Parahydroxybenzylacetone | 5.0 |
| Alpha-ionone (10% in propylene glycol) | 2.0 |
| Ethyl Butyrate | 6.0 |
| Ethyl Acetate | 16.0 |
| Dimethyl Sulfide | 1.0 |
| Isobutyl Acetate | 13.0 |
| Acetic Acid | 10.0 |
| Acetaldehyde | 10.0 |
| Propylene Glycol | 930.0 |

Beta-cyclohomocitral is added to half of the above formulation at the rate of 0.2%. The formulation with the beta-cyclohomocitral is compared with the formulation without the beta-cyclohomocitral at the rate of 0.01 percent (100 ppm) in water and evaluated by a bench panel.

The flavor containing the beta-cyclohomocitral is found to have a substantially more pleasant and better raspberry aroma. It is the unanimous opinion of the bench panel that the chemical, beta-cyclohomocitral rounds the flavor out and contributes to a very natural fresh aroma and taste as found in full ripe raspberries. Accordingly, the flavor with the addition of the beta-cyclohomocitral is considered as substantially better than the flavor without betacyclohomocitral.

EXAMPLE XV

Preparation of Beta-Cyclohomocitral By $H_2O_2$ Peroxidation of Beta-Ionone

To 20 grams of beta-ionone in 100 ml methanol is added 12 ml of 30% hydrogen peroxide. The solution is then cooled to 15°C and 18 ml 6 molar aqueous sodium hydroxide is added over a period of 30 minutes while maintaining the reaction mixture at 15°C. The reaction mixture is then allowed to warm up to 30°C and then maintained at 30°C with external cooling. The exotherm lasts approximately 60 minutes. Examination of the reaction product by gas chromatography indicates that some beta-ionone is still present. An additional 12 ml of 30% $H_2O_2$ and 18 ml 6 molar aqueous NaOH are added during a 30-minute period while maintaining the temperature at 25°C. Again an exotherm occurs lasting approximately 60 minutes during which time the temperature is maintained at 30°C. The reaction mass is then poured into excess water (500 ml) and the product is then extracted with three 150 ml portions of diethyl ether. The combined ether extracts are then washed with two 150 ml portions of saturated sodium chloride solution and dried over anhydrous $MgSO_4$. The solvent is then evaporated to yield 16.8 grams of a crude oil.

Examination of this material by gas chromatography indicates 22% beta-cyclohomocitral.

The desired product is obtained by preparative gas chromatography (conditions: 10 feet × ¼ inch 10% Carbowax 20 M packed stainless steel column at 220°C isothermal).

The structure is confirmed by IR, MS and NMR analyses as being:

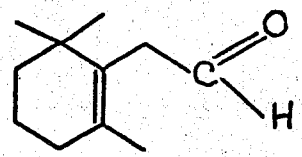

EXAMPLE XVI

Formation of Alpha-Ionone Epoxide From Alpha-Ionone

Into a 500 ml flask equipped with thermometer, stirrer, addition funnel and reflux condenser, the following materials are placed in the following order:

| Ingredients | Amount |
|---|---|
| Acetic Acid | 150 cc |
| Potassium Acetate | 35 grams |
| Alpha-Ionone | 30 grams |

33 grams of 40% peracetic acid is then added dropwise into the reaction mass with stirring at 25°C over a 45-minute period. The reaction mass exotherms for approximately 1 hour and is then allowed to remain at room temperature for a period of 15 hours.

The reaction mass is then poured into 500 ml water and the product is extracted with three 150 cc portions of diethyl ether. The ether extracts are combined and washed with two 100 cc portions of saturated sodium chloride solution and dried over anhydrous magnesium sulfate. The residual oil obtained after stripping the solvent, is distilled at 93°–99°C at 0.5 mm Hg pressure yielding 28.3 g of a clean colorless liquid.

IR, MS and NMR analyses confirm the fact that the product is alpha-ionone epoxide having the structure:

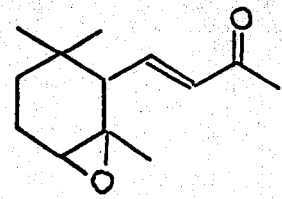

EXAMPLE XVII

Production of Beta-Cyclohomocitral

Into a two liter reaction flask equipped with stirrer, thermometer, addition funnel and cooling bath, the following materials are placed in the following order:

| Ingredients | Amounts |
|---|---|
| Acetic Acid | 450 cc |
| Potassium Acetate | 105 g |
| Beta-Ionone | 96 g |

105 Grams of 40% peracetic acid is then added dropwise to the reaction mass with cooling while maintaining the reaction mass at 25°C+2°C over a 2-hour period. The reaction mass is then stirred for an additional three-hour period (during the first hour a slight exotherm occurs) at 25°C.

The reaction mass is then poured into 1,000 ml water and the resultant product is extracted with three 300 cc volumes of diethyl ether. The ether extracts are combined and washed with two 150 cc portions of saturated sodium chloride solution. The resultant washed ether extract is then evaporated whereby 118 grams of residual oil is obtained.

400 cc of 10% potassium hydroxide solution (50:50 mixture, water:methanol) is prepared and the 118 grams of residual oil obtained above is added thereto. The resultant solution warms up slightly and is stirred for a period of 45 minutes.

The solution is then poured into 500 ml water and the product is extracted with three 250 cc portions of diethyl ether. The diethyl ether extract is then washed with two 200 cc portions of saturated sodium chloride solution, dried over anhydrous magnesium sulfate and evaporated to obtain 89 grams of a crude oil. This crude oil is distilled through a Vigreaux distillation column at 70°-75°C and 2.0 mm Hg pressure to obtain 40.2 grams of a compound having the structure:

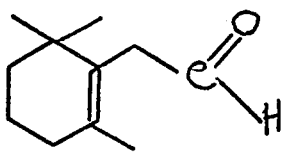

as confirmed by infrared (IR), nuclear magnetic resonance (NMR) and mass (MS) spectra.

EXAMPLE XVIII

Tobacco Formulation

A tobacco mixture is produced by admixing the following ingredients:

| Ingredient | Parts by Weight |
|---|---|
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

Cigarettes are prepared from this tobacco.
The following flavor formulation is prepared:

| Ingredient | Parts by Weight |
|---|---|
| Ethyl butyrate | .05 |
| Ethyl valerate | .05 |
| Maltol | 2.00 |
| Cocoa extract | 26.00 |
| Coffee extract | 10.00 |
| Ethyl alcohol | 20.00 |
| Water | 41.90 |

The above-stated tobacco flavor formulation is applied at the rate of 0.1% to all of the cigarettes produced using the above tobacco formulation. Half of the cigarettes are then treated with 500 or 1,000 ppm of beta-cyclohomocitral produced according to the process of Example XVII. The control cigarettes not containing the beta-cyclohomocitral produced according to the process of Example XVII and the experimental cigarettes which contain the beta-cyclohomocitral produced according to the process of Example XVII are evaluated by paired comparison and the results are as follows:

The experimental cigarettes are found to have more body and to be, on smoking, sweeter, richer, more tobacco-like and less harsh with woody, damascenone-like notes.

The tobacco of the experimental cigarettes, prior to smoking, has sweet, floral, fruity, earthy and green notes. All cigarettes are evaluated for smoke flavor with a 20 mm cellulose acetate filter.

The beta-cyclohomocitral produced according to the process of Example XVII enhances the tobacco-like taste and aroma of the blended cigarette imparting to it woody, damascenone-like notes.

EXAMPLE XIX

Preparation of a Cosmetic-Powder Composition

A cosmetic powder is prepared by mixing in a ball mill, 100 g of talcum powder with 0.25 g of beta-cyclohomocitral prepared according to Example XVII. It has an excellent woody, green, earthy aroma.

EXAMPLE XX

Perfumed Liquid Detergent

Concentrated liquid detergents with a woody, green, earthy odor are prepared containing 0.10%, 0.15% and 0.20% of beta-cyclohomocitral prepared according to Example XVII. They are prepared by adding and homogeneously mixing the appropriate quantity of beta-cyclohomocitral in the liquid detergent. The detergents all possess a woody, green, earthy fragrances, the intensity increasing with greater concentratons of beta-cyclohomocitral.

EXAMPLE XXI

Preparation of a Cologne and Handkerchief Perfume

Beta-cyclohomocitral prepared according to the process of Example XVII is incorporated in a cologne at a concentration of 2.5% in 85% aqueous ethanol; and into a handkerchief perfume at a concentration of 20% (in 95% aqueous ethanol). A distinct and definite woody, green, earthy fragrance is imparted to the cologne and to the handkerchief perfume.

EXAMPLE XXII

Preparation of a Cologne and Handkerchief Perfume

The composition of Example XI is incorporated in a cologne at a concentration of 2.5% in 85% aqueous ethanol; and into a handkerchief perfume at a concentration of 20% (in 95% aqueous ethanol). The use of the beta-cyclohomocitral in the composition of Example XI affords a distinct and definite strong petitgrain aroma with earthy and green notes to the handkerchief perfume and cologne.

EXAMPLE XXIII

Preparation of Soap Composition

One hundred grams of soap chips are mixed with 1 gram of beta-cyclohomocitral until a substantially homogeneous composition is obtained. The perfumed soap composition manifests an excellent woody, green and earthy aroma.

EXAMPLE XXXV

Preparation of a Detergent Composition

A total of 100 g of a detergent powder is mixed with 0.15 g of the beta-cyclohomocitral of Example XVII until a substantially homogeneous composition is obtained. This composition has an excellent woody, green, earthy aroma.

EXAMPLE XXV

Perpropionic acid is prepared in the following manner. A mixture of the following materials:

{ 160 ml propionic acid
  1 ml sulfuric acid (concentrated)
  40 g 50% hydrogen peroxide }   Referred to hereinafter as "Mixture A"

is allowed to stand for 20 hours at room temperature.

The following reactants are placed in a 500 ml reaction flask equipped with a stirrer and cooling bath:

{ 140 ml propionic acid
  75 g potassium acetate
  60 g beta-ionone }   Referred to hereinafter as "Mixture B"

To the stirred Mixture B is added, dropwise, Mixture A over a 60-minute period while maintaining the reaction temperature at 25° ± 2°C by means of external cooling. When the addition is complete the reaction mixuture is stirred for an additional 2 hours at 25°C.

The reaction mixture is then poured into 1,000 ml water and extracted twice with 250 ml portions of diethyl ether. The combined ether extracts are then washed first with water (three 100 ml portions) and then with a saturated solution of sodium chloride (150 ml). The ether solution is then dried over anhydrous magnesium sulfate and the solvent evaporated to yield 78 g of crude oil containing propionic acid as well as product. The crude product is hydrolyzed with a solution of 40 g potassium carbonate in 300 ml of water by heating under reflux, with stirring, for 15 hours. After cooling the organic layer is collected and the aqueous layer is extracted with 200 ml of diethyl ether. After combining the organic materials the solvent is removed by evaporation to yield 57.5 g of oil which is distilled to yield 19.5 g of betahomocyclocitral (Yield: 37%).

EXAMPLE XXVI

Performic acid is prepared in the following manner: 20 g 50% hydrogen peroxide and 80 ml of formic acid is admixed and the reaction mass is left at room temperature for 1.5 hours.

To a mixture consisting of 50 g of potassium acetate, 70 ml of acetic acid and 30 g of beta -ionone is added the preformed performic acid, prepared as described above, dropwise over a 30 minute period while maintaining the temperature of the stirred reaction mass at 25°C by means of external cooling. After the addition is complete, the mixture is stirred for a further 90 minutes at 25°C and is then poured into 800 ml of water. The product is extracted with two 200 ml portions of diethyl ether. The ether extracts are combined, washed with two 150 ml portions of saturated sodium chloride solution and then dried. Removal of the solvent by evaporation yields 32.5 g crude oil.

A gas chromatographic analysis of this material shows the following compositions:

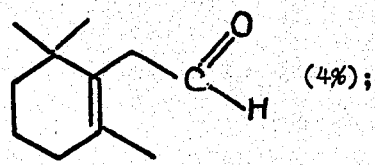

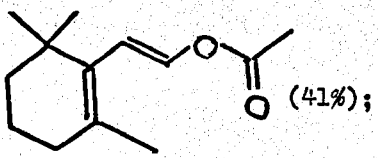

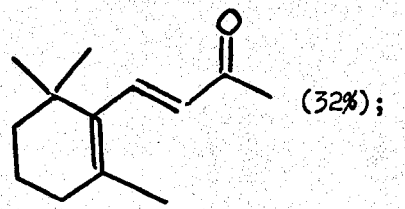

Other products 23%

The following mixture is prepared:

20 g Lithium carbonate 200 ml 50% aqueous methanol

To this is added the crude enol ester product obtained as described above. The mixture is then heated at 65°–70°C until substantially complete hydrolysis of the enol ester to beta-homocyclocitral as indicated by gas chromatographic analysis. Water is added to the reaction mass which is then extracted with three 100 cc portions of diethyl ether. The combined ether extracts are washed twice with two 100 cc portions of saturated sodium chloride solution, dried over anhydrous magnesium sulfate and evaporated to obtain an oil, beta-cyclohomocitral.

The crude is distilled at 2 mm Hg pressure and the fraction boiling at 70°–80°C is collected.

Gas chromatographic analysis indicates that the product is about 85% pure. A pure sample of betacyclohomocitral is obtained by preparative chromatography and is characterized by the following analytical data as:

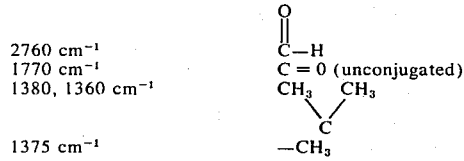

Mass spectral fragmentation, in decreasing order of ion abundance:

m/e (%) 107(100); 29(93); 151(90); 41(88); 81(80); 95(67); 123(57); 55(45); 39(45); 27(43); 166Mol ion) (35).

Infrared spectrum shows characteristic absorption at:

| | |
|---|---|
| 2760 cm$^{-1}$ | $\overset{O}{\underset{\|}{C}}$—H |
| 1770 cm$^{-1}$ | C = O (unconjugated) |
| 1380, 1360 cm$^{-1}$ | CH$_3$  CH$_3$ \\ / \\ C |
| 1375 cm$^{-1}$ | —CH$_3$ |

The NMR spectrum of the compound is in agreement with the above structure:

| (PPM) | Multiplicity | Assignment | Number of Protons |
|---|---|---|---|
| 0.98 | (s) | CH$_3$\\ >C CH$_3$/ | 6H |
| 1.58 | (s) | =C—CH$_3$ | |
| 1.80–1.42 | (m) | —CH$_2$— | 9H |
| 2.00 | (t) | =C—CH$_2$—$\overset{O}{\underset{\|}{C}}$ | 2H |
| 9.58 | (t) | HC=O | 1H |

What is claimed is:

1. A process for altering, modifying or enhancing the aroma or taste of a foodstuff comprising the step of adding to said foodstuff in an amount of from 0.5 ppm up to about 20 ppm by weight based on the total composition of 2,6,6-trimethyl-1-cyclohexen-1-ylacetaldehyde having the structure:

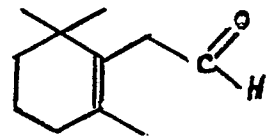

2. A process for altering, modifying or enhancing the raspberry aroma or taste of a foodstuff which comprises adding thereto a small but effective amount of a composition consisting essentially of 2,6,6-trimethyl-1-cyclohexen-1-ylacetaldehyde having the structure:

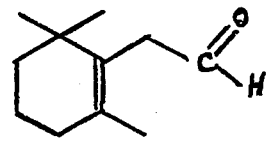

3. A red berry flavor or aroma modifying composition consisting essentially of (i) from about 0.1% up to about 15% by weight based on the total weight of said flavor modifying composition of 2,6,6-trimethyl-1-cyclohexen-1-ylacetaldehyde having the structure:

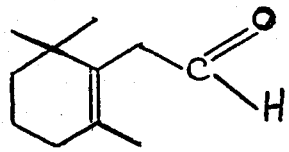

and (ii) a flavor adjuvant selected from the group consisting of p-hydroxybenzyl acetone, maltol, benzyl acetate, methyl cinnamate, geraniol, ethyl methyl phenyl glycidate, vanillin, methyl anthranilate, alpha-ionone, gamma undecalactone, ethyl pelargonate, isoamyl acetate, acetaldehyde, dimethyl sulfide, isobutyl acetate, acetic acid, ethyl butyrate, diacetyl, anethole, cis-3-hexenol-1, naphthyl ethyl ether, ethyl acetate, isoamyl butyrate, 2-methyl-2-pentenoic acid, 2(4-hydroxy-4-methylphenyl norbornadiene, 4-allyl-1,2,6-trimethoxy benzene and 4-propenyl-1,2,6-trimethoxy benzene.

* * * * *